United States Patent Office 3,181,971
Patented May 4, 1965

3,181,971
INSULATED COPPER ARTICLES
Laurence Stephen Rayner, Welwyn Garden City, England, assignor to Imperial Chemical Industries Limited, London, England, a corporation of Great Britain
No Drawing. Filed May 29, 1961, Ser. No. 113,077
Claims priority, application Great Britain, May 30, 1960, 19,003/60
20 Claims. (Cl. 117—232)

This invention relates to polymeric compositions suitable as insulants for copper, and to copper articles insulated therewith.

It is well known that it is desirable to incorporate antioxidants into solid polymers (including copolymers) of propylene, e.g. polypropylene (particularly isotactic polypropylene), and copolymers (which may be regular, for instance block copolymers, or random) of propylene with other aliphatic mono-α-olefines, for instance ethylene, butene-1, 3-methyl-butene-1, or 4-methyl-pentene-1. These materials have good insulating properties and are therefore desirable for use as insulating coatings on copper.

The solid polymers of propylene, particularly isotactic polypropylene, by which I mean a solid polypropylene not less than 75% of which is insoluble in heptane, are materials with excellent mechanical and electrical properties which are easily shaped into strips, ribbons and coatings by normal shaping processes of the plastics industry such as extrusion. It has generally been found, however, that these polymers are rapidly degraded and become brittle when in the presence of copper, particularly when they are subjected to elevated temperatures, even when they have admixed with them to best antioxidants known in the art.

An object of the present invention is to provide a composition suitable for the production of insulated copper articles, e.g. coated wire, mouldings with copper inserts, and condensers, in which the insulant comprises a solid polymer of propylene with a valuable stability to oxidative degradation even at elevated temperatures.

According to the present invention I now provide a polymeric composition suitable for use in close contact with copper, which composition comprises a solid polymer of propylene, particularly isotactic polypropylene, a phenolic antioxidant, and a non-volatile primary or secondary, preferably primary, aromatic or aliphatic (including cycloaliphatic) amino-compound, said secondary aromatic amino compounds having at least one nitrogen atom to which is attached not more than one aryl group. Aromatic amines may give rise to troublesome staining. For some applications, such as carbon-black filled compositions, this may be unimportant.

However, as will be seen hereafter I have found certain primary aromatic amines to cause very little staining. These amines are, in general, not those which are generally preferred as antioxidants in rubber and plastics.

Amino-compounds which may be used are for instance amines of boiling point greater than about 200° C., for example: mono-primary amines—n-nonylamine, decylamine, dodecylamine, hexadecylamine, octadecylamine, docosylamine, p-toluidine, 2-amino-p-xylene, 4-amino-m-xylene, o-, m- and p-anisidines, o-, m- and p-phenetidines, o-, m- and p-chloro-anilines, o-, m- and p-bromoanilines, mesidine, 1-cumidine, 4-amino-3-bromotoluene, p-benzylaniline, methyl anthranilate, ethyl anthranilate, α-naphthylamine, ac- and ar-tetrahydro-α-naphthylamine, β-naphthylamine, ac- and ar-tetrahydro-β-naphthylamines, 4-aminodiphenyl, p-aminoacetophenone, p-amino-benzophenone, benzohydrylamine, m- and p-amino-triphenylmethanes; diprimary amines (which may also contain secondary amine or ether groups)—hexamethylene diamine, decamethylene diamine, dodecamethylene diamine, γ,γ'-diaminodipropyl ether, 1,6-di(γ-aminopropoxy)hexane, tri(ethylene glycol)diamine, tetra(ethylene glycol)diamine, diethylene triamine, triethylene tetramine, p-di(β-amino-ethoxy)benzene, bis(p-aminobenzyl), 1,6-di(p-aminophenyl)hexane, 2,4'-diaminodiphenyl, p,p'-diaminodiphenyl methane, 2,2-bis(4-aminophenyl)propane, p,p'-di-aminomethyl phenyl ether, 1,2-di(4'-aminophenoxy) ethane, o-, m- and p-phenylene diamines, the various tolylene diamines e.g. 2,4- and 2,6-tolylene diamines; the various diaminoxylenes for instance 1,3-dimethyl-4,6-diaminobenzene, 1,2-dimethyl-3,5-diaminobenzene; 1-ethyl-2,4-diaminobenzene, 1-ethyl 3,5-diamino benzene, 1-ethyl-2,6-diamino benzene, 1,4-di(β-aminoethoxy)cyclohexane, 1,2-di(4' - aminocyclohexyl)ethane, 4,4'-diaminodicyclohexyl methane, 1,6-di(4'-aminocyclohexyl)hexane, 2,4'-diamino dicyclohexyl, 2,2-bis(4'-aminocyclohexyl)propane; mono- and di-secondary amines formed from any of the above by the replacement of one hydrogen of one or more primary amino groups by an aliphatic or arylaliphatic e.g. alkyl, cycloalkyl, hydroxyalkyl, acyloxyalkyl or aralykl group may also be used; other secondary amines of boiling point at least 200° C. for example diethanolamine, decahydroquinoline, dicyclohexylamine or diisooctylamine may also be used. Although diarylamines do not fall within this invention, their amino-derivatives, e.g. p-aminodiphenylamine and p,p'-diaminodiphenylamine may be used.

In general, those amino-compounds having at least one primary amino group are preferred.

Amino compounds having two primary amino groups may if desired have one of these acylated; thus for instance mono-acetyl, butyryl, benzoyl, lauroyl, palmitoyl or stearoyl derivatives of any of the above diprimary amines or of diamines of greater volatility than those listed above, e.g. ethylene diamine or tetramethylene diamine may be used where the boiling points of the acyl derivatives are above about 200° C.

Acylation of a diamine provides a ready method of obtaining amino-compounds of low volatility; since it may at the same time considerably raise the melting point, care should be be taken that the melting point of the acyl derivatives (and indeed of any amino-compound use in this invention) is not greater than the temperatures normally used for compounding polypropylene, i.e. about 180–250° C.

As examples of amino-compounds other than simple amines we may mention acid hydrazides, for example stearic hydrazide, adipic terephthalic or sebacic dihydrazides, and sebacic di(monoethyl hydrazide).

I prefer that the amino compound has a boiling point of at least 250° C. 4,4'-diaminodiphenyl methane, p-amino acetanilide, diethylene triamine and sebacic dihydrazide have given extremely good reults. Diethanolamine octadecylamine and decamethylene diamine have also given useful protection.

Many of these amino-compounds, e.g. p-aminoacetanilide, do not confer any extra protection on polypropylene stabilised with my mixtures of phenolic compounds and sulphur compounds in the absence of copper, and do not prevent the degradation of polypropylene in the presence of copper when they are used in the absence of my phenolic stabiliser. I find that the aliphatic amino-compounds usually cause less staining than the aromatic amino-compounds, the acid hydrazides being particularly good in this respect.

With the aromatic compounds, those having two or more amino groups tend to stain more than those having only one.

As will be seen from the examples, only slight discoloration occurred with some of the amino-compounds exemplified, whilst others gave white compositions.

It is seldom necessary to use more than 5% by weight of the amino-compound by weight of the composition, and in general whilst useful protection has been obtained with as little as 0.1% I prefer that 0.25–2% is used.

Particularly effective antioxidants are the phenolic antioxidants containing at least two phenolic residues, particularly those having the generic formula:

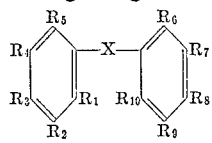

where X is a mono- or di-sulphide group, preferably a monosulphide group, or is

and in which $R_1$ or $R_3$ and $R_6$ or $R_8$ is an OH group, and in which the remaining substituents are hydrocarbon (preferably aliphatic or cycloaliphatic) groups, alkoxyl groups, or hydrogen atoms, there being at least one hydrocarbon group ortho or para to each hydroxyl group, and in which $R_{11}$ and $R_{12}$ are selected from alkyl groups, hydroxy aryl groups, hydroxyaryl-substituted hydrocarbon groups, hydroxyaryl - substituted oxacycloalkyl groups, cycloalkyl groups and hydrogen atoms, or $R_{11}$ and $R_{12}$, together with the central carbon atom which joins them, form a cycloalkane or alkylcycloalkane ring.

Examples of suitable phenolic antioxidants are the compounds formed by condensing two molecules of a phenol with one molecule of an aldehyde or ketone or sulphur mono- or di-chloride, particularly sulphur dichloride. The phenol preferably has a large ortho- or para-hydrocarbon substituent e.g. an alkyl, or cycloalkyl group for instance tertiary butyl, octyl or nonyl, or cyclohexyl. The substituted phenols which may be used are for instance, o-cresol, o-ethyl phenol, o-propyl and isopropyl phenols, o-butyl phenols, particularly o-tertiary butyl phenol, o-amyl phenols, o-hexyl phenols, o-heptyl phenols, o-octyl phenols, particularly tertiary octyl phenol, i.e. α,α,γ,γ-tetramethylbutyl phenol, o-nonyl phenols, o-decyl phenols, o-undecyl phenols, o-dodecyl phenols, phenols substituted in an ortho-position as above and also in a second ortho or in the opposite meta position, for instance 2,6-xylenol, 2-methyl-6-tertiary butyl phenol, 2,6-ditertiary butyl phenol, 3-methyl-6-tertiary butyl phenol, 3-methyl-6-tertiary octyl phenol, 3-methoxy-6-tertiary butyl phenol, 3-ethyl-6-tertiary octyl phenol, 3-methyl-6-nonyl phenol, 3-methyl-6-α-methyl-cyclohexyl phenol; phenols having an ortho position free and having the para position blocked by any of the above groups, for example p-cresol, p-tertiary butyl phenol, p-tertiary octyl phenol, p-nonyl phenol, 2,4-xylenol, 2,4-ditertiary butyl phenol, 2-tertiary butyl-4-methyl phenol. 2-isopropyl-4-methyl-phenol and 2-octyl-4-methoxy phenol may also be used.

In the above list of phenols the higher alkyl phenols such as heptyl, octyl, nonyl, decyl, undecyl and dodecyl phenols are for the most part available as technical-grade commercial products in which the alkyl groups are formed by the dimerisation, trimerisation and co-dimerisation of for example, propylene, isobutylene and pentenes.

Phenols with a large ortho-substituent e.g. octyl or nonyl or a highly branched e.g. tertiary butyl and a small e.g. methyl or ethyl substituent in the opposite meta position are particularly preferred for the effectiveness and lack of staining of their condensates.

The aldehyde suitably has an organic group containing from one to twenty preferably six to twenty, and particularly seven to twelve carbon atoms attached to its carbonyl group, although formaldehyde may be used but is not preferred as its condensates are more liable to stain. The ketone suitably has organic groups containing from two to twenty, preferably six to twenty and particularly seven to twelve carbon atoms attached to its carbonyl group.

Suitable aldehydes and ketones are for example, acetaldehyde, acetone, propionaldehyde, methyl ethyl ketone, butyraldehyde, diethyl ketone, valeric aldehyde, hexanals and hexanones, 3,5-dimethyl-4-hydroxy benzaldehyde, 2 - methyl - 4 - hydroxy - 5 - tertiary butyl acetophenone, methylcyclohexanone, α- and β-(2-methyl-4-hydroxy-5-tertiary butyl phenyl)propiophenones, the various heptanals for instances 3-methyl hexanal, heptanones, e.g. heptanone-3, octanals, e.g. commercial isooctanal, nonanals, e.g. commercial nonanal, diisobutyl ketone, decanals, e.g. commercial decanal, undecanals, methyl undecyl ketone, dodecanals, acrolein, crotonaldehyde, methacrolein, methyl vinyl ketone, pent-2-enal, mesityl oxide, cyclohexenone, methylcyclohexenone, 1-methylcyclohexene-4-al, methacrolein dimer, crotonaldehyde dimer, cinnamaldehyde, benzalacetone, citral, 3-tertiary-butyl-4-hydroxy-cinnamaldehyde, dibenzalacetone, glyoxal, succinic aldehyde, diacetyl, acetylacetone and acetonylacetone. Other aldehydes and ketones e.g. formylcyclohexane may be used but for reasons of economy and for the greatest ease of preparation of the phenolic compounds it is preferred to use aldehydes and ketones containing not more than about twenty carbon atoms.

Of these aldehydes and ketones, the commercial octanals, nonanals, decanals, undecanals and dodecanals are technical grade products derived from the dimerisation, trimerisation or mixed dimerisation of, for example, propylene, butenes, and pentenes, the olefines thus obtained being then subjected to the Oxo synthesis.

In some cases, e.g. with p-nonyl phenol, acetone gives particularly effective condensates. When p-substituted phenols having a free ortho position are thus used chromanes are normally obtained mixed with the phenolic compounds used in this invention and do not need to be removed from them.

If the aldehyde or ketone is unsaturated and is stable to the strongly acid conditions of condensation, e.g. crotonaldehyde, we find that a further phenolic residue may be added across the double bond; these condensates are preferred. It should be noted that the reaction does not always take the desired course.

Thus in my condensation of 2,6-dimethyl phenol with acrolein in the presence of HCl as catalyst, a molecule of HCl is added across the double bond of the aldehyde instead of the expected phenol molecule.

Under the same conditions, 3-methyl-6-tertiary butyl phenol gives the expected product.

Other condensates which have the expected structure are for example those from 3-methyl-6-tertiary butyl phenol with crotonaldehyde or cinnamaldehyde, and 2,6-dimethyl phenol with crotonaldehyde.

Other very suitable phenolic antioxidants are the condensates of dialdehydes, di-ketones or aliphatic aldehydes and ketones having alkylated hydroxy aryl substituents with alkylated phenols. As examples of phenolic compounds particularly useful for their effectiveness and lack of staining we may mention condensates of two molecules of 3-methyl-6-tertiary butyl phenol or 3-methyl-6-tertiary octyl phenol with 1 molecule of acetone, butyraldehyde, 3-methyl hexanal, iso-octanal, nonanal, e.g. 3,5,5-trimethyl n-hexanal, decanal, or sulphur dichloride and condensates of 3 molecules of the said phenols with 1 molecule of acrolein, methacrolein dimer, crotonaldehyde dimer, cinnamaldehyde, citral, 1-methyl cyclohexene-4-al, methyl vinyl ketone, dibenzal acetone, mesityl oxide and cyclohexenone; acrolein, methacrolein, crotonaldehyde and cinnamaldehyde are very effective, the two latter being particularly preferred.

Similar condensates of para-substituted phenols, particularly those in which the substituent has at least six carbon atoms, e.g. para-octyl and para-nonyl phenols are also very effective. This is a most useful and unexpected finding since hitherto as is shown in copending United States patent applications Serial Nos. 44,278 and 77,811 filed, respectively, on July 21, 1960, and December 23, 1960, I have found that these condensates are practically ineffective in the presence of copper. Condensates of 4 molecules of the above o- or p-substituted phenols with 1 molecule of a di-aldehyde or diketone e.g. glyoxal, succinic aldehyde, diacetyl, acetyl acetone and acetonyl acetone are effective, but some of them for instance a condensate of glyoxal and 3-methyl-6-tertiary-butyl phenol tend to stain. Other condensates which are usually effective but which in some cases (especially where the ortho substituents are methyl) tend to stain, and which are usually more difficult to prepare, since under the more vigorous condensation conditions required large ortho-substituents tend to split off the phenol, are the condensates of 2,6-dialkyl phenols, for instance, 2,6-dimethyl phenol, with the above listed aldehydes and ketones. The linear resinous condensates of para-substituted phenols e.g. para-tertiary butyl phenyl with aldehydes, for instance the formaldehyde condensates known to the art as novolak resins may also be used but are not preferred. I have found that the effectiveness of stabilisation may vary with the phenolic compound used; thus a spirohydrindene formed by the condensation of 3 molecules of acetone with 2 molecules of catechol showed little improvement on the addition of amine. It is preferred that the phenolic compound has a boiling point of at least 200° C. at a pressure of 1 mm. of mercury. It should not however have so high a molecular weight that it is not easily compatible with the olefin polymer.

I prefer that substituents on the phenol used in preparing any of my bisphenol components of low volatility do not provide more than twelve additional carbon atoms to the phenol, as phenols of higher molecular weight in general are not more useful but merely more expensive.

The phenolic compounds are especially effective when they are used in conjunction with an organic sulphur compound in which the sulphur is divalent as for instance one or more of the following:

An organic sulphur compound containing a group or groups (1) having one or more divalent sulphur atoms linked to carbon, sulphur and carbon, carbon and carbon, or carbon and hydrogen, the group (1) being attached to groups selected from the class consisting of monovalent and divalent organic groups, and hydrogen atoms, the sole non-hydrocarbon substituents in any of said organic groups being thioether groups, disulphide groups, sulphydryl groups, amine groups, ether groups, groups (2) having the formula

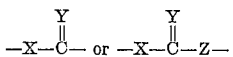

where X and Z are —O—, —S—, or —NR— groups and Y is oxygen or sulphur and R is a hydrocarbon group or a hydrogen atom and the free valencies are attached to organic groups, hydroxyl groups, and halogen atoms, the sulphur compounds of said class having a molecular weight of at least 250. It is preferred that not all the groups (1) are groups (2).

Especially effective sulphur compounds of this class are those in which there is at least one group (1) having at least two sulphide-sulphur atoms linked to a single carbon atom, the said groups (1) preferably each having not more than one hydrogen atom attached to the carbon atom which joins the sulphur atoms, and in which at least one, preferably at least two carbon atoms separate any aryl residue in any organic group which is attached by a carbon atom to the carbon atom of a group (1) from said carbon atom of group (1).

The main classes of sulphur compound which may be used are (1) mercaptans, thioethers and disulphides, polymeric thioethers or disulphides, (2) diesters of thiodialkanoic acids, and sulphur-containing condensates and polycondensates having ester, carbonate, amide, urea, or urethane groups (any of which may be replaced by their various thio analogues, in which case all or part of the sulphur may be supplied by these groups), and (3) mercaptals, mercaptols, orthiothioesters, orthothiocarbonates, and polymeric mercaptals and mercaptols.

(1) Mercaptans suitable for use in my compositions are for example n-hexadecyl, n-octadecyl and behenyl mercaptans.

Typical organic thioethers and disulphides which may be used in the present invention are di-n-lauryl, n-hexadecyl, n-octadecyl and behenyl thioethers and disulphides, di-t-hexadecyl disulphide and mixed compounds such as n-hexadecyl-n-octadecyl thioether, and reaction products of lauryl mercaptan with ethylene oxide or propylene oxide. Polymeric thioethers, disulphides and mercaptans of the simplest form have repeating groups which are one or more of the groups

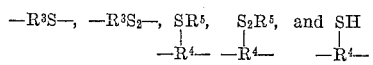

where $R^3$ is a divalent hydrocarbon radical, $R^4$ is a trivalent hydrocarbon radical and $R^5$ is a monovalent hydrocarbon radical. However, if desired, methylene groups of any of said hydrocarbon radicals may be replaced by ether groups and hydrogen atoms in said hydrocarbon radicals may be replaced by sulphydryl groups, hydroxyl groups or halogen atoms and in the case of the monovalent hydrocarbon radicals methylene groups may be replaced by thioether or disulphide groups.

Examples of polymeric thioethers, disulphides and mercaptans which may be used are polydecamethylene sulphide, polydecamethylene/hexamethylene sulphide, polyhexamethylene sulphide, polyhexamethylene/pentamethylene sulphide, polypentamethylene sulphide, polytetramethylene sulphide, polytrimethylene sulphide, polydecamethylene disulphide, polypentamethylene disulphide, polytrimethylene disulphide, poly-p-xylylene sulphide, poly(p-tolyl ether)sulphide, poly(methyl vinyl sulphide), the addition products of natural and synthetic diene polymers with hydrogen sulphide or mercaptans, reaction products of thiodiglycol with paraformaldehyde, polythiodiglycol, sulphurised polythene, and the polymeric arylidene mercaptals which for convenience are set out under (3).

The molecular weight limit I have set for the mercaptans is lower than that set for the remainder of the class. This is because I believe that the mercaptans are at least in part converted into the highly active disulphides on or after incorporation into the polymer, particularly if the incorporation is carried out at high temperatures and in the presence of at least traces of oxygen. However, although the mercaptans and disulphides are extremely active as antioxidants when used with phenols, they do not always show such a large improvement on on addition of amines to the mixtures containing them as do the monosulphides, and purely thermal degradation at high temperatures tends to be greater than when the monosulphides are used. The monosulphides are therefore preferred.

Sulphides containing hydrocarbon groups of high molecular weight are advantageous since low volatility is necessary in subsequent processing and ageing at elevated temperatures.

While all my sulphur compounds exhibit a satisfactory resistance to staining, the simple sulphides i.e. the non-polymeric ones particularly the mercaptans and monosulphides are outstanding in this respect.

Polymeric thioethers and disulphides are very effective and it is preferred that in these polymeric compounds there should be long chain alkylene groups e.g. hexamethylene or decamethylene groups separating the sulphur atoms. The preparation and use of many of these sulphur compounds (and of polymeric arylidene mercaptals, which for convenience and to avoid repetition are included in (3) below together with other mercaptals and mercaptols) is described in copending United States application Serial No. 93,019, filed March 3, 1961.

(2) The di-esters of thiodialkanoic acids are particularly satisfactory when they are esters of aliphatic alcohols, especially alcohols of 10–20 carbon atoms e.g. lauryl or stearyl alcohol. Suitable thiodialkanoic acids are for example β-thiodipropionic, γ-thiobutyric, δ-thiodivaleric and ε-thiodicaproic acids. When di-lauryl thiodibutyrate is used it has been found that the rate of purely thermal degradation of polypropylene at 320° C. is lower than when di-lauryl thiodipropionate is used.

It has been found that the sulphur compounds having substantially all the groups (2) as nitrogen containing groups i.e. —NR.CO—, —NR.CS—, —NR.CO.O—,

—NR.CO.S—, —NR.CS.O—, —NR.CS.S—

—NR.CO.NR—, —NR.CS.NR— where R is a hydrocarbon group or hydrogen atom sometimes have rather high melting points and are difficult to compound with polypropylene. The sulphur containing groups (2) i.e.
—O.CS—, —S.CO—, —S.CS—, —S.CO.O—
—O.CS.O—, —S.CO.S—, S.CS.O—, —S.CS.S—
—NR.CS—, —NR.CO.S—, —NR.CS.O—, —NR.CS.S—
and —NR.CS.NR— may give rise to more staining than sulphur free groups (2) and in some cases are more liable to react with copper than these latter groups. Accordingly, the sulphur free groups (2) i.e. —O.CO—,

—O.CO.O—, —NR.CO—, —NR.CO.O— and —NR.CO.NR— groups are preferred. The ester groups are particularly preferred for the ease with which they may be introduced and the generally low melting points, good compatibility, high activity and low staining of the esters. The sulphur compound should therefore preferably contain not more than half its groups (2) as sulphur or nitrogen containing groups or else the number of such sulphur or nitrogen containing groups (2) should be small in relation to the total number of groups (1) in the molecule.

Sulphur compounds which may be used are those containing residues derived, for example, from the compounds listed below, it being understood that it is preferred that the compounds are so chosen that either at least one of the compounds chosen from A to G contains sulphide and/or sulphydryl groups or at least one of the compounds chosen from A to G contains a double bond across which a mercaptan, dithiol, or hydrogen sulphide may be added subsequently to the condensation of the chosen compounds.

Residues derived by the removal of a hydrogen atom from one or more of the hydroxyl and/or sulphydryl and/or amino groups of:

A. Glycols, e.g. ethylene, propylene, trimethylene, neopentyl pentamethylene, hexamethylene and decamethylene glycols, glyceryl monostearate, thiodiglycol, 3-octadecylthiol-propanediol, 4,4′-bis(hydroxy methyl phenyl) ether; polyether glycols e.g. HO(C$_2$H$_4$O)$_n$H; polyether/thioether glycols e.g. HO(CH$_2$CH$_2$SCH$_2$CH$_2$O)$_n$H; polythioethers e.g. HS(C$_4$H$_8$S)$_n$H; alkanolamines, mercaptoalkanols, e.g. β-mercaptoethanol; α-thioglycerol; diamines e.g. hexamethylene diamine, β,β′-diamino-diethyl sulphide; or any of the diamines listed earlier as aminocompounds for use in this invention; aminopolyalkylene ether alcohols e.g. NH$_2$(C$_2$H$_4$O)$_n$H; polyalkylene polyamines e.g. NHR(C$_2$H$_4$NR)$_n$H where R is a hydrocarbon radical; urea; thiourea; bis-phenols e.g. bisphenol A; spirohydrindenes obtainable by the condensation of three molecules of a ketone having at least two free hydrogen atoms on each of the carbon atoms attached to its carbonyl group with two molecules of a phenol having a meta and the para position free; glycerol, tri(hydroxymethyl)methane, 1,2,3-tri(hydroxymethyl)-propane, pentaerythritol, mannitol, dulcitol, sorbitol, 1,6 - mannitol dithiol, thiosorbitol, thioglucose thiofructose thiomannose and polyalkylene polyamines e.g. NH$_2$(C$_2$H$_4$NH)$_n$H, melamine, polyvinyl alcohol, polyallyl alcohol, polymethllyl alcohol, dithiols, e.g. hexamethylene dithiol.

Residues derived by the removal of a hydroxyl group from each of two or more carboxyl groups of acids such as:

B. Adipic acid, succinic acid, pimelic acid, sebacic acid, malic acid, phthalic acid, isophthalic acid, terephthalic acid, thiodiglycollic acid, β,β′-thiodipropionic acid, α,α′-thiodipropionic acid, γ,γ′-thiodibutyric acid, fumaric, maleic, dodecenyl succinic and α-methylene-α′-methyl adipic acids and their hydrogen sulphide, mercaptan, and dithiol adducts e.g. the acids obtained by hydrolysis of the sulphur-containing esters of specification No. 859,773, and tricarballylic acid.

Residues derived by the removal of a hydrogen atom from a hydroxyl, amino or sulphydryl group and of a hydroxyl group from a carboxyl group or groups of hydroxy, amino, or mercapto acids, for instance:

C. Glycollic acid, lactic acid, γ-hydroxybutyric acid, δ-hydroxyvaleric acid, ε-hydroxycaproic acid, ε-amino caproic acid, mercaptoacetic acid, β-mercaptopropionic acid, γ-mercapto-butyric acid, citric acid, malic acid, thiomalic acid.

Residues derived by the removal of two chlorine atoms from:

D. Phosgene, thiophosgene.

Residues derived by the addition of a hydrogen atom from e.g. a hydroxyl, amino or sulphydryl group or a polycondensate having such terminal groups to:

E. Hexamethylene diisocyanate or diisothiocyanate, decamethylene diisocyanate or diisothiocyanate, diphenylmethane diisocyanate, 2:6-toluene diisocyanate, and 2:4-toluene diisocyanate.

The sulphur compounds may contain mono-functional groups as end groups, such as the residues derived by removal of one hydrogen atom from the functional groups of:

F. Mono-alcohols, such as butanol, 2-ethyl hexanol, nonanol or cyclohexanol; mono-amines, such as cyclohexylamine or octadecylamine; mono-thiols, such as tertiary butyl mercaptan or dodecyl mercaptan.

Residues derived by the removal of a hydroxyl group from the carboxyl group of:

G. Mono-carboxylic acids, such as benzoic acid, oleic acid, stearic acid; or the residues derived by addition of a hydrogen atom to the functional groups of:

H. Mono-isocyanates or monoisothiocyanates such as phenyl isocyanate or naphthyl isothiocyanate.

The organic residues to which the functional groups of compounds of the classes F to H just mentioned are attached may contain sulphur; e.g. 3-thia-pentanol-1 may be used as a monoalcohol, or 4-thia-1-octanoic acid may be used as a mono-acid. The amount of these monofunctional groups, which act as end groups and so prevent an indefinite increase of molecular weight even then the condensation reaction is carried to substantial completion or prevent the cross-linking of polyfunctional compounds chosen from A to D may be chosen according to principles well known to those skilled in the art so as to control the molecular weight within any desired range.

Compounds listed under A to H above and their obvious chemical equivalents are for convenience hereinafter and in the appended claims referred to as compounds A, compounds B etc.

The compounds A should preferably, to avoid cross-linking and hardening of the polycondensate, contain only two groups selected from the class consisting of hydroxyl sulphydryl and amino groups and compounds B only two carboxyl groups. Compounds C should preferably, for the same reason, contain only one such group and one carboxyl group. In each case however, it is usually possible by suitable choice of reaction time or temperature or the molecular ratio of the reactants or by carrying out the condensation in the presence of sufficient monofunctional compounds F or G as may be appropriate to prevent cross-linking according to principles well known in the art.

It is preferred that sulphur atoms should be separated by at least one carbon atom from groups (2).

Very effective sulphur compounds based on thioacids are found to be those with two or three carbon atoms separating a carbonyl group from a sulphide group, e.g. β-thiodipropionic and γ-thiodibutyric acids.

Of the diamines, the aliphatic diamines are preferred owing to the lower level of staining associated with their use.

As has already been suggested above, mercaptans, dithiols or hydrogen sulphide may be added across the double bond of an unsaturated condensate of compounds, including compounds chosen from the classes A to D, which need not themselves contain sulphur; such compounds contain at least two ethylenic double bonds linked by at least one group (2); examples of suitable condensates are polyesters of maleic or α-methylen-α'-methyl adipic acid, and glycerides and glycol esters of unsaturated acids, for example triolein and glycol dioleate. Sulphur monochloride or sulphur may also be added to give factice-like compounds. These are useful if they are not cross-linked. Another very suitable method of preparing our sulphur compounds which usually results in compositions of good activity is to react a condensate or polycondensate containing two thiol groups linked together by at least one group (2), for instance glycol dimercapto-acetate, β-mercaptoethyl adipate, β-mercaptoethyl, β-mercaptopropionate, or the corresponding amides with iodine to form a polymeric disulphide. It is preferred for the greatest compatibility of our sulphur compounds that groups (2) should not form too high a proportion of the total number of carbon atoms present; the activity of the sulphur compounds tends to increase with the number of carbon atoms separating sulphur atoms or groups (2) from each other in the polymeric sulphur compounds.

The presence of too high a proportion of sulphur in the sulphur compound can cause staining. For all the reasons set out above, therefore, I prefer that the sulphur atoms are separated from each other and groups (2) are separated from each other by in each case a hydrocarbon group having at least two carbon atoms; ethylene glycol condensates are cheap and effective. Glycols having for example from six to ten carbon atoms, for instance the polymethylene glycols, are very effective but are less cheap.

Very useful sulphur compounds are polycondensates of ethylene, pentamethylene, hexamethylene or decamethylene glycol with β-thiodipropionic acid, decamethylene glycol with thiodibutyric acid, α-thioglycerol with adipic acid, bisphenol A with thiodipropionyl chloride, maleic acid with hexamethylene glycol (lauryl mercaptan being subsequently added across the double bond of the maleic acid), thiomalic acid with hexamethylene glycol, and thiodiglycol with both glycollic and succinic acids. Other sulphur compounds which may be used but are not preferred are, for example, condensates of polythiodiglycol with hexamethylene diisocyanate, hexamethylene diisocyanate with a polyester of ethylene glycol and thiodipropionic acid, decamethylene diisocyanate with a polyester of pentamethylene glycol and thiodibutyric acid and thiol-terminated polytetramethylene sulphide with hexamethylene diisocyanate.

The preparation and use of these sulphur containing polycondensates (and of polymeric arylidene mercaptals and mercaptols, which for convenience and to avoid repetition are included in (3) below) is described in United States Application Serial No. 94,698 filed on March 10, 1961.

(3) In the mercaptals and mercaptols (which may be polymeric) and the orthothioesters and orthothiocarbonates it is preferred that any organic group attached to the carbon atoms of a group (1) is aliphatic.

It is also preferred that any other organic groups in the sulphur compound are aliphatic. Aliphatic hydrocarbon groups are particularly preferred for their effectiveness and for reasons of economy.

Substitution products of the above-mentioned hydrocarbon groups may also be used in which hydrogen atoms are replaced by for example alcoholic or phenolic hydroxyl, sulphydryl, amino or alkyl amino groups, or methylene groups are replaced by for example ether, thioether, carbonyl, thiocarbonyl, or tertiary amine groups, or residues derived from the compounds of lists A–H set out above under (2). If these residues are present then the remarks concerning groups (2) under 2 above apply and will not be repeated. There is however no great advantage in using condensates as intermediates which are of such a high molecular weight that the proportion of thiol groups, and hence of the active groups (1) in the final condensate, is unduly lowered.

I find that very active aldehyde or ketone condensates are obtained when the intermediate condensate comprises only a few units of compounds A to H, as for example glycol dimercapto acetate, and for reasons of economy and effectiveness these simple intermediate condensates are preferred.

As examples of sulphur compounds which may be used I may mention.

(a) Simple mercaptals and mercaptols: Nonylidene distearyl mercaptal, ethylidene distearyl mercaptal, γ-phenylpropylidene dilauryl mercaptal, isopropylidene dibehenyl mercaptol, nonylidene di(ω-mercapto-n-decyl)mercaptal, 19,21-dithianonatriacontane, and compounds having the formulae:

$C_8H_{17}CH[-SCH_2CH_2SCH_2CH_2SCH_2CH_3]_2$ $C_6H_5CH_2CH_2CH\left(-S-\underset{|}{CH}.COSR\atop CH_2COSR\right)_2$ $C_6H_5CH_2CH[-S-CH_2-C(CH_2SCOC_{11}H_{23})_3]_2$ $C_3H_8CH\left(S-\underset{|}{CH}-CO_2C_{16}H_{33}\atop CH_2CO_2C_{16}H_{33}\right)_2$ ; $C_8H_{17}CH(S.CH_2COOC_8H_{17})_2$ $HO(C_mH_{2m}O)_nC_6H_4CH_2CH_2CH(SC_4H_9)_2$, $[(C_{12}H_{25}S)_2CHCH_2]_2$ $CH_3C(SC_{12}H_{25})_2C(SC_{12}H_{25})_2$
$\qquad\qquad\qquad |$
$\qquad\qquad\qquad CH_3$ $C_4H_9CH[-S-CH(C_xH_{2x+1})-(CH_2)_y-COOC_{12}H_{25}]_2$ $C_{12}H_{25}SCHS(CH_2)_6SCHSC_{12}H_{25}$
$\quad\ \ \ |\qquad\qquad\qquad\ \ |$
$\quad\ \ C_8H_{17}\qquad\qquad\ \ C_8H_{17}$ $C_{18}H_{37}OCO(CH_2)_3SCHS(CH_2)_4SCHS(CH_2)_3COOC_{18}H_{37}$
$\qquad\qquad\qquad\ \ |\qquad\qquad\qquad\ |$
$\qquad\qquad\qquad C_8H_{17}\qquad\qquad C_8H_{17}$ $C_{11}H_{23}CH(-SCH_2CH_2NHCOC_{11}N_{23})_2$ $C_{21}H_{43}CH[-S-CH_2CH_2CONHC_{12}H_{25}]_2$, $CH_3CHCH_2CH(SC_{18}H_{37})_2$
$\qquad\qquad\qquad\qquad\qquad\qquad\qquad\qquad\qquad\ |$
$\qquad\qquad\qquad\qquad\qquad\qquad\qquad\qquad SC_{18}H_{37}$ $CH_3CH_2CHCH(SC_{16}H_{33})_2$, $C_{17}H_{35}CH[-SCH_2CH_2COOC_{12}H_{25}]_2$
$\quad\ \ |$
$\quad SC_{16}H_{33}$ $C_{21}H_{43}CH[-S-(CH_2)_3CON(C_6H_{11})_2]_2$ $C_5H_{11}CH[-S-CH(C_xH_{2x+1})-(CH_2)_y-CONH_2]_2$ $C_8H_{17}CH[S(CH_2)_6SH]_2$, $C_7H_{15}CH[S(CH_2)_{10}SH]_2$ (b) Heterocyclic compounds:

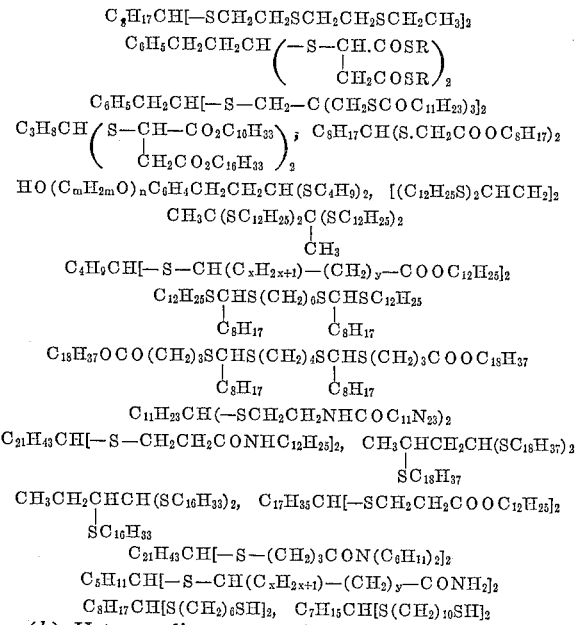

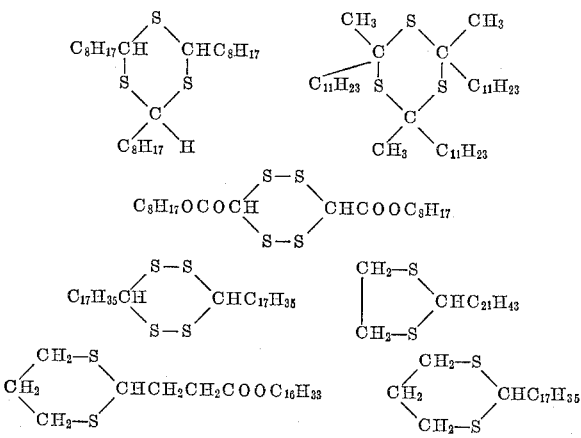

(c) Polymeric mercaptals and mercaptols having chain elements selected from the following groups:

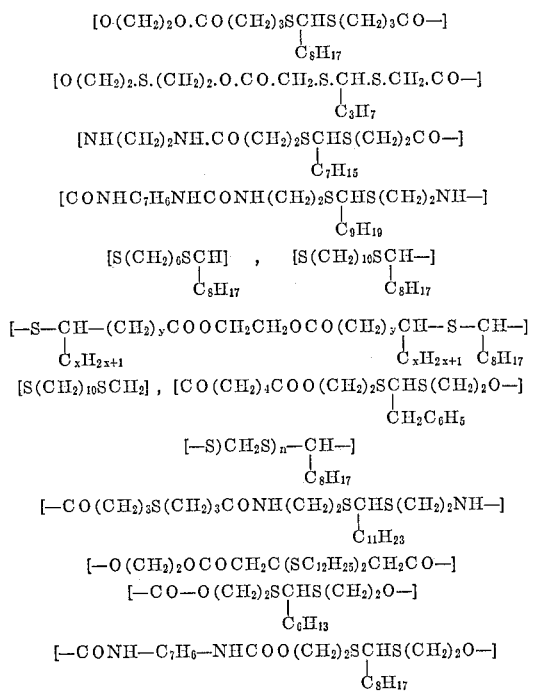

It will be understood that in any of the above formulae for the mercaptals and mercaptols —CO— may be replaced by —CS— and —O— by —S— (preferably in each case in a minor proportion) and that organic groups in which some but not all of the methylene groups are replaced by ether, thioether, carbonyl, thiocarbonyl or tertiary amine groups may be used instead of hydrocarbon groups. Thus thiodiglycol and N,N-di-(β-hydroxyethyl)methylamine may either be used as glycols which may be reacted with e.g. thioglycollic acid to form dimercapto compounds for condensation with an aldehyde or ketone, or else they or any of the glycols, diamines, etc. listed above may be polycondensed with e.g. a reaction product of an aldehyde or ketone with a mercapto acid. This second method is generally less convenient and is not preferred.

Although in the above description under (a) to (c) I have referred only to mercaptals and mercaptols of aliphatic and aryl aliphatic aldehydes and ketones since these are the most effective, it will be understood that very good results are obtained when aldehydes and ketones having aromatic residues directly linked to the carbonyl group, e.g. benzaldehyde, acetophenone or benzophenone are used.

The hydroxyarylidene mercaptals from, for instance, p-hydroxybenzaldehyde are less active.

The preparation of arylidene and hydroxyarylidene mercaptals is described in United States patent applications Serial Nos. 93,019 and 94,698 filed, respectively, on March 3, 1961 and March 10, 1961. Particular examples of very effective compounds are condensates of benzaldehyde with glycol dimercaptoacetate or with decamethylene dithiol.

(d) Orthothioesters and orthothiocarbonates:

$HC(SC_{18}H_{37})_3$, $(C_6H_{11}S)_2CH.C(SC_6H_{11})_3$
$(C_6H_{11}S)_3C.C(SC_6H_{11})_3$, $C_5H_{11}SCH_2.C(SC_5H_{11})_3$
$CH_3C(SC_{12}H_{25})_3$, $C(SC_6H_{13})_4$, $C(SC_8H_{17})_4$

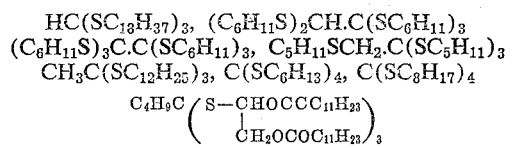

Simple mercaptals and mercaptols may be prepared by, for instance, the reaction of a mercapto-compound with an aldehyde or ketone; see for example chapter 10 (R. Connor) in Gilman's Organic Chemistry (An Advanced Treatise) (second edition, John Wiley and Sons, New York/Chapman and Hall, London, 1943), particularly p. 849, which chapter also describes (pp. 841–844) the preparation of mercaptans and other mercapto-compounds.

Heterocyclic mercaptols and mercaptols may be prepared by (a) the reaction of for example a di- or trimethylene dithiol with an aldehyde or ketone or gem-dihalide, or an aldehyde or ketonic ester, (b) by reacting an aldehyde or ketone with hydrogen sulphide or sodium thiosulphate, preferably in the presence of an acid or zinc chloride as catalyst, to give a cyclic trimer or the thioaldehyde or ketone (the thioaldehyde or ketone molecules may be the same or different), (c) by reacting a gem-dihalide with an alkali metal disulphide. Suitable gem-dihalides are for instance, 2,2-dichloro-in-tridecane, 1,1-dichloro-n-octadecane, gem-dichloro esters e.g. esters of dichloroacetic acid, and the corresponding gem-di bromides.

Orthothioesters may for example be prepared by the reaction of a halide containing a trihalomethyl group and also if desired further halogen substituents on other carbon atoms with three molecules of an alkali metal mercaptide, or in the case of the orthothioformates by reaction of a mercaptan with formic acid. Suitable halides containing the trihalomethyl group are for example chloroform, hexachloroethane, pentachloroethane, asym-tetrachloroethane, 1,1,1-trichloroethane and the corresponding bromides.

The preparation of all of our sulphur compounds is preferably carried out in the absence of air.

I find that when an unsaturated aldehyde or ketone is used, more than two molecules of the mercaptan may react, the mercaptan molecules in excess of two being added across the double bonds or bonds. Unsaturated aldehydes and ketones are preferably not used with dimercapto compounds because of the danger of cross-linking to infusible materials, unless suitable precautions are taken to minimise or prevent this, for instance by including a simple mercaptan in the condensation mixture or by choice of reactant ratios or the reaction temperature or time as is known to the worker skilled in the art. I prefer that the hydrocarbon groups of the aldehyde or ketone are aliphatic, particularly long-chain aliphatic groups e.g. octyl or heptadecyl groups which may be straight or branched.

Aldehydes and ketones which may be used are for example formaldehyde, acetaldehyde, propionaldehyde, butyraldehyde, isobutyraldehyde, the various pentanals, e.g. valeric aldehyde, the various hexanals, e.g. n-hexanal, the various heptanals, e.g. 3-methyl hexanal, octanals, e.g. commercial isoctanal, nonanals, e.g. commercial nonanal, decanals, e.g. commercial decanals, undecanal, dodecanals, e.g. lauric aldehyde, tetradecanals e.g. myristic aldehyde, hexadecanals e.g. palmitic aldehyde, octadecanals, e.g. stearic aldehyde, eicosanals, behenic aldehyde, acetone, methyl ethyl ketone, diethyl ketone, methyl propyl and isopropyl ketones, the various hexanones e.g. methyl butyl ketone, cyclohexanone, the various heptanones, methyl cyclohexanone, diisobutyl ketone, methyl undecyl ketone, acrolein, crotonaldehyde, methacrolein, methyl vinyl ketone, methyl isopropenyl ketone, pent-2-enal, mesityl oxide, cyclohexenone, methyl cyclohexenone, 1-methyl-cyclohexen-4-al, methacrolein dimer, crotonaldehyde dimer, cinnamaldehyde, benzalacetone, citral, dibenzalacetone, glyoxal, diacetyl, succinic aldehyde, acetyl-acetone, acetonylacetone and low molecular weight polymers and copolymers of methyl vinyl ketone or methyl isopropenyl ketone. The corresponding dihalides, e.g. alkylidene dihalides, may also be used as may gem-dihalo esters and amides and aldehydic or ketonic esters and amides.

Other aldehydes and ketones may be used, but for reasons of economy and for the greatest ease of preparation of the sulphur compounds it is preferred to use aldehydes and ketones containing not more than about twenty-two atoms.

My sulphur compounds discussed under 1-3 above should preferably have a molecular weight of at least 350. This in order to ensure a satisfactorily low volatility, so that they are not easily lost from the compositions during processing or use at elevated temperatures. Sulphur compounds having molecular weights as low as about 250 may however be used for stabilising compositions which are not to be exposed to temperatures such that volatilisation is significant. I find that some mercaptans of fairly low molecular weight, e.g. octadecyl mercaptan, are very active; I believe that this may be due to their conversion at least in part into the disulphides on or after incorporation into the polymer, particularly if the incorporation is carried out at high temperatures and in the presence of at least traces of oxygen.

The volatility of the sulphur compounds decreases so rapidly as their molecular weights increase, however, that there is no substantial gain in using sulphur compounds having molecular weights greater than about 1,000. On the other hand, if the molecular weight of the sulphur compound is very high it may be difficult to incorporate it into the hydrocarbon polymer by reason of its high melt viscosity or lowered compatibility with the olefine polymer.

Sulphur compounds having large hydrocarbon substituents are particularly suitable, since the hydrocarbon substituents increase the compatibility of the sulphur compound with hydrocarbon polymers. I prefer large alkyl substituents, e.g. tertiary butyl, isooctyl, nonyl and lauryl groups.

I therefore prefer to use sulphur compounds having average molecular weights between about 250 and about 5,000, particularly between about 350 and about 1,000. Relatively high molecular weight sulphur compounds, e.g. of molecular weight between about 3,000 and 5,000 in some cases improve the impact strength and lower the brittleness temperature of our compositions.

If as is preferred a phenolic antioxidant is used in combination with an organic sulphur compound I find that useful stabilised compositions may be obtained with widely varied ratios of said sulphur compound to said phenolic compound and whilst my invention is in no way limited to particular ratios of these ingredients, I find that particularly effective ratios of these ingredients are when there are from 0.1 to 12 hydroxyl radicals provided to the composition by the phenolic compound to each sulphur atom provided to the composition by the sulphur compound. It is seldom necessary to use more than 5% of the said phenolic compound together with the sulphur compound and, in general, 0.2-1% for example 0.5% of the said phenolic compound together with an appropriate amount of the sulphur compound is sufficient.

The compositions of this invention may be made by any of the mastication processes. Thus a satisfactory method where the stabilising ingredients are all powders is to tumble blend the ingredients with the isotactic polypropylene and then to extrude the mixture so obtained. Another satisfactory method for mixing the stabilising ingredients and isotactic polypropylene made by the low pressure process is to add a solution of the components to isotactic polypropylene powder obtained by this process and then to remove the solvent for the stabilising components by evaporation.

The compositions of this invention may also contain other stabilisers such as materials which absorb ultra violet light. They may also contain further ancillary ingredients such as processing aids, for example, the soaps of calcium and zinc, and also such materials as pigments, dyes and fillers. Thus carbon black may be incorporated either as an absorber of ultraviolet light or as a pigment.

The following experimental details illustrate our invention. It will be understood, however, that our invention is in no way limited by these details.

Condensation products were made from 3-methyl-6-tertiary-butyl phenol and sulphur dichloride by a method based on that disclosed in British Patent No. 796,285.

A condensation product from nonyl phenol and acetone was prepared by condensing technical nonyl phenol (substitution being principally in the para position) with acetone by saturating the mixture with anhydrous hydrogen chloride at 60° C. and holding at that temperature for 70 hours.

Condensation products from 3-methyl-6-tertiary butyl phenol and respectively crotonaldehyde and cinnamaldehyde were prepared by the method of United States patent application Serial No. 44,278, filed July 21, 1960.

EXAMPLE 1

Polypropylene of melt flow index 5 (as measured by the A.S.T.M. method modified by using a 10 kg. weight instead of the weight specified for causing extrusion) was mixed on open rolls at 180° C. with dilauryl beta-thiodipropionate and phenol/ketone or phenol/SCl$_2$ condensates, and an amine as set out in the following table.

Samples were pressed on to copper gauze made from wire of diameter 0.036″ to give a sample of total thickness 0.068″.

These coated gauzes were held in an air oven at temperatures in the range 140° C. to 150° C. until the coatings were found to be brittle when handled.

Comparative tests were performed on copper gauze coated with similar compositions containing no amine.

| Expt. | Temp., °C. | Phenol condensate | Quantity of lauryl thiodipropionate, percent | Amine | Embrittlement time |
|---|---|---|---|---|---|
| 1 | 140-150 | 0.5% p-nonylphenol/acetone | 0.5 | | 10-25 hrs. |
| 2 | 140-150 | do | 0.5 | 1% diethanolamine | 3-4 days. |
| 3 | 140-150 | do | 0.5 | 1% 4,4'-diaminodiphenylmethane. | 14 days. |
| 4 | 140-150 | do | 0.5 | 1% p-aminoacetanilide | Do. |
| 5 | 140-150 | do | 0.5 | 1% sebacic dihydrazide | 36 days. |
| 6 | 140-150 | do | 0.5 | 1% decamethylenediamine | 6 days. |
| 7 | 143 | do | 0.5 | 0.1% diethylenetriamine | 4 days. |
| 8 | 143 | 0.5% thiobis (3-methyl-6-tertiarybutylphenol). | 0.5 | | <4 days. |
| 9 | 143 | do | 0.5 | 0.1% sebacic dihydrazide | 30-33 days. |
| 10 | 143 | do | 0.5 | 0.1% diaminodiphenylmethane. | 27-28 days. |
| 11 | 150 | 0.1% thiobis (3-methyl-6-tertiarybutylphenol). | 0.25 | | <1 day. |
| 12 | 150 | do | 0.25 | 0.1% diaminodiphenylmethane. | 3-4 days. |

EXAMPLES 2-5

Further samples of polypropylene compounded as set out below, were extruded at 240° C. (Examples 2-4) and 280° C. (Example 5) on to copper wire of diameter 0.036″ to give coatings ranging in thickness from 0.0085 to 0.0105″. The coated wires were subjected to oven ageing at 120° C. and 143° C. Embrittlement times ($T_{143}$ and $T_{120}$) are in hours.

EXAMPLE 2

In these experiments, the results are tabulated in block form for ease of comparison. In each case the amine was p-aminoacetanilide (PAAA), and the other additives (in the proportions 5:5:4 parts by weight respectively) were a condensate of 3 molecules of 3-methyl-6-tertiary butyl phenol (3M6B) with one molecule of crotonaldehyde (CA), dilauryl thiodipropionate (DLTDP) and calcium stearate (CaSt$_2$). Thus "0.35% of other additives" indicates that the polypropylene contained 3M6B/CA 0.125%, DLTDP 0.125%, CaSt$_2$ 0.1% by weight. In each cell of the block, the results are in the order: radial thickness of coating R, colour of composition C, $T_{143°\,C.}$ (hours), $T_{120°\,C.}$ (hours).

| Expt. | Amine, percent | | Other additives | | |
|---|---|---|---|---|---|
| | | | 0.35% | 0.7% | 1.4% |
| 13–15 | 0 | R | 0.009'' | 0.0095'' | 9.0095''. |
| | | C | White | Natural white. | Natural. |
| | | $T_{143}$ | 19–23 | 40–65 | 160–184. |
| | | $T_{120}$ | 322–344 | 546–574 | >893. |
| 16–18 | 0.25 | R | 0.0095'' | 0.0095'' | 0.010''. |
| | | C | Pale pink | Pale pink brown. | Pale pink brown. |
| | | $T_{143}$ | 23–38 | 88–160 | 208–232. |
| | | $T_{120}$ | 473–499 | 574–641 | >893. |
| 19–20 | 0.5 | R | 0.009'' | 0.0095'' | 0.0095''. |
| | | C | Pinkish brown. | Pale pinkish brown. | Pale pink brown. |
| | | $T_{143}$ | 23–42 | 184–208 | 208–232. |
| | | $T_{120}$ | 473–499 | 879–893 | >893. |

The effect of the amine in increasing the protection conferred by the other additives is clearly seen from these figures.

*Experiments 13(a)–21(a)*

Polypropylene samples compounded as in experiments 13 to 21 were moulded at 190° C. into sheets 1/50 of an inch thick. Samples 1'' x 1'' cut from these sheets were held in air ovens A and B (the air circulation being greater in B than in A) at 140° C. until they were found to be brittle when handled. The results of these tests were as follows (times being average values, in days):

| Experiment | Oven | | | | | |
|---|---|---|---|---|---|---|
| | A | B | A | B | A | B |
| 13(a)–15(a) | 18 | 11 | 19 | 15 | 28 | 20 |
| 16(a)–18(a) | 18 | 11 | 19 | 15 | 31 | 20 |
| 19(a)–21(a) | 18 | 10 | 20 | 15 | 28 | 18 |

These results show that, in the absence of copper, p-aminoacetanilide has no significant effect on the stability of the polypropylene.

EXAMPLE 3

| Expt. | R | 3M6B/CA, Percent | DLTDP, Percent | PAAA, Percent | CaSt$_2$, Percent | Colour | $T_{143}$ | $T_{120}$ |
|---|---|---|---|---|---|---|---|---|
| 22 | 0.009'' | | | 1.0 | 0.4 | Pale pinkish brown. | 2½–6½ | 17–43 |
| 23 | 0.0095'' | 0.25 | 0.75 | 0.5 | 0.4 | Light brown | 160–184 | >831 |
| 24 | 0.0095'' | 0.75 | 0.25 | 0.5 | 0.4 | ___do___ | 208–232 | 807–831 |
| 25 | 0.0095'' | 0.5 | | 0.5 | 0.4 | ___do___ | 160–184 | 584–641 |
| 26 | 0.0095'' | | 0.5 | 0.5 | 0.4 | ___do___ | 2½–6½ | 199–250 |

It will be seen from these results that p-aminoacetanilide alone has no significant effect on stability in the presence of copper. The addition of thiodipropionate to the amine in the absence of phenol has little or no effect, the phenol being an absolutely necessary component. Comparison of Experiments 21 and 25 shows that in this case, where a phenol is present, the thiodipropionate does lead to an improvement in resistance to oxidation.

EXAMPLE 4

The following experiments illustrate (a) the effect of replacing dilauryl thiodipropionate by dilauryl thiodibutyrate (DLTDB) and (b) the effect of replacing p-aminoacetanilide by sebacic dihydrazide (SDH), p,p'-diaminodiphenyl methane (PDM), or octadecylamine (ODA) (0.5% 3M6B/CA and 0.4% CaSt$_2$ present in all cases).

| Expt. | R | Thio compound, 0.5% | Amine | C | $T_{143}$ (hrs.) |
|---|---|---|---|---|---|
| 27 | 0.010 | DLTDP | | White | 142–165 |
| 28 | 0.010 | DLTDP | 0.5% PAAA | Pale pinkish brown. | 192–261 |
| 29 | 0.0105 | DLTDB | | White | 142–165 |
| 30 | 0.010 | DLTDB | 0.5% PAAA | Pale pinkish brown. | 334–357 |
| 31 | 0.0105 | DLTDP | 0.5% SDH | White | 165–192 |
| 32 | 0.010 | DLTDP | 0.5% PDM | ___do___ | 165–192 |
| 33 | 0.010 | DLTDP | 0.5% ODA | ___do___ | 165–192 |

These results indicate that dilauryl thiodibutyrate is even more effective than dilauryl thiodipropionate, in preventing thermally-induced oxidative degradation at 143° C.

The amines SDH and PDM are almost as effective as PAAA in the protection which they confer at 143° C., and even the very slight pinkish brown discolouration of Experiment 28 is absent in Experiments 31 to 33.

In Examples 2–4 the melt index of the polypropylene (measured as before) was about 30.

EXAMPLE 5

Polypropylene of melt index about 0.5 (measured as before) was compounded as set out below and tested as before.

| Expt. | R | Phenol, 0.5% | Thio compound, 0.5% | PAAA, percent | CaSt$_2$, percent | C | $T_{143}$ | $T_{120}$ |
|---|---|---|---|---|---|---|---|---|
| 34 | 0.010 | 3M6B/CA | DLTDP | 0.5 | | Pale pinkish brown. | 88–160 | 544–572 |
| 35 | 0.0095 | 3M6B/CA | DLTDP | | 0.4 | White | 40–65 | 497–520 |
| 36 | 0.0085 | 3M6B/CA | DLTDP | 0.5 | 0.4 | Pale pinkish brown. | 65–88 | 520–544 |
| 37 | 0.009 | 3M6B/Cinn | DLTDP | | 0.4 | Off-white | 7–16 | 473–497 |
| 38 | 0.0095 | 3M6B/Cinn | DLTDP | 0.5 | 0.4 | Pale pinkish brown. | 208–232 | >855 |
| 39 | 0.0085 | 3M6B/CA | DHS | | 0.4 | White | 16–19 | 401–473 |
| 40 | 0.0105 | 3M6B/CA | DHS | 0.5 | 0.4 | Pale pinkish brown. | 88–160 | 544–572 |
| 41 | 0.010 | 3M6B/CA | OM | | 0.4 | Off-white | 88–120 | 544–572 |
| 42 | 0.0095 | 3M6B/CA | OM | 0.5 | 0.4 | Pale brown | 120–160 | 572–639 |

(Cinn=cinnamaldehyde. DHS=dihexadecylsulphide. OM=octadecylmercaptan.)

This polypropylene, having a low melt index, has rather less satisfactory extrusion characteristics than the polymers used in Examples 1–4, and the coatings were somewhat rough and uneven. The values of R quoted above are therefore maximum values as determined by a micrometer screw gauge and there were many thinner patches, causing more rapid degradation in some cases (particularly Experiments 37 and 39) than would have been expected from the level of stabiliser present.

*Experiments 35a–40a*

Polypropylene samples compounded as in Experiments 35 to 40 were tested as in Experiments 13(a) to 21(a). The results were as follows:

| Expt. | Oven A | Oven B |
| --- | --- | --- |
| 35a | 14 days | 10 days |
| 36a | 14 days | 10 days |
| 37a | 28 days | 15 days |
| 38a | 20 days | 13 days |
| 39a | 24 days | 13 days |
| 40a | 28 days | 15 days |

Comparison of Experiment 35a with 36a, 37a with 38a and 39a and 40a shows that the amine (p-aminoacetanilide) had no significant effect on the stability of the polypropylene in the absence of copper.

I claim:

1. Copper articles insulated with a polymeric composition comprising a solid polymer of propylene and as stabilizer therefor a mixture of (a) a phenolic antioxidant which has a boiling point of at least 200° C. at a pressure of 1 mm. of mercury and has the formula:

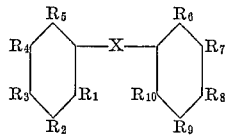

where X is selected from the class consisting of monosulfide groups, disulfide groups, and groups

in which one of $R_1$ and $R_3$ and one of $R_6$ and $R_8$ is a hydroxyl group, and in which the remaining substituents are selected from the group consisting of hydrocarbon groups, alkoxy groups, and hydrogen atoms, there being in at least one of the positions ortho and para to each hydroxyl group a hydrocarbon substituent, and in which $R_{11}$ and $R_{12}$ are selected from the group consisting of alkyl groups, cycloalkyl groups, hydroxyaryl groups, hydroxyaryl-substituted hydrocarbon groups, hydroxyaryl-substituted oxa-cycloalkyl groups, hydrogen atoms, and groups forming, together with the carbon atom which joins them, a cycloalkane ring, and (b) a non-volatile amino-compound having a boiling point of at least 250° C., selected from the group consisting of primary aliphatic, primary cycloaliphatic and primary aromatic amino compounds, secondary aliphatic, and secondary cycloaliphatic amino compounds and secondary aromatic amino compounds having at least one nitrogen atom to which is attached at most one aryl group.

2. Copper articles according to claim 1 wherein the amino-compound is 4,4'-diaminodiphenylmethane.

3. Copper articles according to claim 1 wherein the amino-compound is p-aminoacetanilide.

4. Copper articles according to claim 1 wherein the amino-compound is sebacic dihydrazide.

5. Copper articles according to claim 1 wherein the amino-compound is octadecylamine.

6. Copper articles according to claim 1 wherein the phenolic antioxidant is a condensate of three molecules of 3-methyl-6-tertiary butyl phenol with one molecule of crotonaldehyde.

7. Copper articles according to claim 1 wherein the phenolic antioxidant is a condensate of three molecules of 3-methyl-6-tertiary butyl phenol with one molecule of cinnamaldehyde.

8. Copper articles according to claim 1 wherein the phenolic antioxidant is a condensate of p-nonyl phenol and acetone.

9. Copper articles according to claim 1 wherein the phenolic antioxidant is 4,4'-thiobis(3-methyl-6-tertiary butyl phenol).

10. Copper articles according to claim 1 in which the composition also contains an organic sulphur compound having a molecular weight of at least 250 and at least one group (1) having at least one divalent sulphur atom linked to atoms selected from the group consisting of carbon atoms, sulphur atoms and carbon atoms, carbon atoms and carbon atoms, and carbon atoms and hydrogen atoms, the group (1) being attached to groups selected from the class consisting of monovalent and divalent organic groups and hydrogen atoms, the sole constituents of any of said organic groups being selected from the class consisting of hydrocarbon groups, thioether groups, disulphide groups, sulphydryl groups, amino groups, hydroxyl groups, ether groups, and halogen atoms, and groups (2) selected from groups having the formula

and groups having the formula

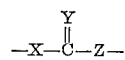

where X and Z are selected from the group consisting of —O—, —S—, and —NR— groups and Y is selected from the group consisting of oxygen and sulphur and R is selected from the group consisting of hydrocarbon groups and hydrogen atoms and the free valencies are attached to organic groups.

11. Copper articles according to claim 10 wherein the organic sulphur compound is dilauryl thiodipropionate.

12. Copper articles according to claim 10 wherein the organic sulphur compound is dilauryl thiodibutyrate.

13. Copper articles according to claim 10 wherein the organic sulphur compound is dihexadecyl sulphide.

14. Copper articles according to claim 10 wherein the organic sulphur compound is octadecyl mercaptan.

15. Copper articles according to claim 1 wherein the stabilizer comprises a mixture of from 0.2 to 1% of a condensate of p-nonyl phenol and acetone, from 0.1 to 2% of sebacic dihydrazide, and an amount of dilauryl thiodipropionate corresponding to there being from 0.1 to 12 phenolic hydroxyl radicals provided by the said condensate to each sulphur atom provided by the dilauryl thiodipropionate, the percentages being by weight of the said polymeric composition.

16. Copper articles according to claim 1 wherein the stabilizer comprises a mixture of from 0.2 to 1% of a condensate of three molecules of 3 - methyl - 6 - tertiary butyl phenol with one molecule of crotonaldehyde, from 0.1 to 2% of p-aminoacetanilide, and an amount of dilauryl thiodipropionate corresponding to there being from 0.1 to 12 phenolic hydroxyl radicals provided by the said condensate to each sulphur atom provided by the dilauryl thiodipropionate, the percentages being by weight of the said polymeric composition.

17. Copper articles according to claim 1 wherein the stabilizer comprises a mixture of from 0.2 to 1% of a condensate of three molecules of 3-methyl-6-tertiary butyl phenol with one molecule of crotonaldehyde, from 0.1 to 2% of p-aminoacetanilide, and an amount of dilauryl thiodibutyrate corresponding to there being from 0.1 to 12 phenolic hydroxyl radicals provided by the said condensate to each sulphur atom provided by the dilauryl thiodibutyrate, the percentages being by weight of the said polymeric composition.

18. Copper articles according to claim 1 wherein the stabilizer comprises a mixture of from 0.2 to 1% of a condensate of three molecules of 3-methyl-6-tertiary butyl phenol with one molecule of crotonaldehyde, from 0.1 to 2% of p-aminoacetanilide, and an amount of dihexadecyl sulphide corresponding to there being from 0.1 to 12 phenolic hydroxyl radicals provided by the said condensate to each sulphur atom provided by the dihexadecyl sulphide, the percentages being by weight of the said polymeric composition.

19. Copper articles according to claim 1 wherein the stabilizer comprises a mixture of from 0.2 to 1% of a condensate of three molecules of 3-methyl-6-tertiary butyl phenol with one molecule of crotonaldehyde, from 0.1 to 2% of p-aminoacetanilide, and an amount of octadecyl mercaptan corresponding to there being from 0.1 to 12 phenolic hydroxyl radicals provided by the said condensate to each sulphur atom provided by the octadecyl mercaptan, the percentages being by weight of the said polymeric composition.

20. Copper articles according to claim 1 wherein the stabilizer comprises a mixture of from 0.2 to 1% of a condensate of three molecules of 3-methyl-6-tertiary butyl phenol with one molecule of cinnamaldehyde, from 0.1 to 2% of p-aminoacetanilide, and an amount of dilauryl thiodipropionate corresponding to there being from 0.1 to 12 phenolic hydroxyl radicals provided by the said condensate to each sulphur atom provided by the dilauryl thiodipropionate, the percentages being by weight of the said polymeric composition.

References Cited by the Examiner
UNITED STATES PATENTS

| | | | |
|---|---|---|---|
| 2,960,488 | 11/60 | Tamblyn et al. | 260—45.8 |
| 2,967,845 | 1/61 | Hawkins et al. | 260—45.7 |
| 2,967,847 | 1/61 | Hawkins et al. | 260—45.7 |
| 2,967,848 | 1/61 | Hawkins et al. | 260—45.7 |
| 2,968,641 | 1/61 | Roberts | 260—45.8 |
| 2,998,405 | 8/61 | Weldy | 260—45.8 |
| 3,013,003 | 12/61 | Maragliano et al. | 260—45.7 |
| 3,017,371 | 1/62 | Hohenberg et al. | 117—232 |
| 3,020,258 | 2/62 | Robbins | 260—45.9 |
| 3,020,259 | 2/62 | Schulde et al. | 260—45.9 |

RICHARD D. NEVIUS, *Primary Examiner.*
LEON J. BERCOVITZ, *Examiner.*